(12) United States Patent
Ferger (10) Patent No.: US 11,533,894 B2
(45) Date of Patent: Dec. 27, 2022

(54) ANGLING SYSTEM

(71) Applicant: NEW DIRECTION TACKLE LTD., Eastleigh (GB)

(72) Inventor: Benjamin Ferger, Frohnhausen (DE)

(73) Assignee: New Direction Tackle Ltd., Eastleigh (GB)

( * ) Notice: Subject to any disclaimer, the term of this patent is extended or adjusted under 35 U.S.C. 154(b) by 159 days.

(21) Appl. No.: 16/661,598

(22) Filed: Oct. 23, 2019

(65) Prior Publication Data

US 2021/0100235 A1 Apr. 8, 2021

(30) Foreign Application Priority Data

Oct. 8, 2019 (EP) .................................... 19201940

(51) Int. Cl.
*A01K 97/12* (2006.01)
*H04N 5/235* (2006.01)

(52) U.S. Cl.
CPC ......... *A01K 97/125* (2013.01); *H04N 5/2353* (2013.01)

(58) Field of Classification Search
CPC .... H04N 5/2353; A01K 97/125; A01K 97/01; A01K 87/007
USPC .......................................................... 43/17
See application file for complete search history.

(56) References Cited

U.S. PATENT DOCUMENTS

| | | | | |
|---|---|---|---|---|
| 8,896,450 B1 * | 11/2014 | Overbye | ............... | A01K 97/125 340/573.2 |
| 10,188,088 B2 * | 1/2019 | Zdroik | ................... | A01K 97/00 |
| 2015/0113853 A1 * | 4/2015 | McKeough | .......... | A01K 97/125 702/41 |
| 2016/0178993 A1 | 6/2016 | Bianciardi | | |
| 2016/0323535 A1 * | 11/2016 | Hu | ........................ | H04N 7/181 |
| 2017/0064238 A1 * | 3/2017 | Kardashov | ....... | H04N 21/43637 |
| 2017/0161961 A1 * | 6/2017 | Salsberg | ................ | G06V 20/17 |
| 2018/0316844 A1 * | 11/2018 | Hatcher, Jr. | ............ | H04N 5/247 |

FOREIGN PATENT DOCUMENTS

| | | | | |
|---|---|---|---|---|
| DE | 202012102213 | * | 9/2013 | ............. H04N 5/232 |
| FR | 3037206 A1 | | 12/2016 | |
| GB | 2506214 A | | 3/2014 | |

* cited by examiner

*Primary Examiner* — Maria El-Zoobi
(74) *Attorney, Agent, or Firm* — Greenberg Traurig, LLP

(57) ABSTRACT

An angling system is disclosed. The system may include at least one fish bite detector and a fish bite sensor connected to a transmitter or transceiver. The fish bite detector may be configured to transmit a fish bite signal upon the fish bite sensor detecting a fish bite. The system may include at least one camera or at least one shutter actuator. The camera or shutter actuator may include a receiver or transceiver pairable with the transmitter or transceiver of the fish bite detector so as to receive fish bite signals transmitted by each paired fish bite detector. The camera or shutter may be configured to record/actuate upon receiving a fish bite signal.

10 Claims, 3 Drawing Sheets

ANGLING SYSTEM

CROSS REFERENCE TO RELATED APPLICATIONS

The present patent application claims priority under 35 U.S.C. § 119 to European Patent Application No. 19201940.4, entitled "ANGLING SYSTEM," filed Oct. 8, 2019, which patent application is incorporated herein by reference in its entirety.

FIELD OF THE INVENTION

The present invention relates to an angling system, in particular an angling system comprising at least one fish bite detector and one from: at least one camera; at least one shutter actuator for attachment to a camera; and at least one mobile device.

BACKGROUND

Fish bite detectors, devices which are couplable to fishing lines to detect movement of the fishing line indicative of a fish bite, are well known in the art and commonly used in carp fishing. Such detectors generally comprise an alarm which sounds upon detection of movement of the fishing line indicative of a fish bite. Some fish bite detectors comprise an illumination means which lights up upon detection of a fish bite. The user of the fish bite detector is alerted to a potential fish bite by the alarm and/or the illumination means and can check the fishing line coupled to the fish bite detector for a catch. Fish bite detectors allow anglers to set up their fishing equipment and be alerted to fish bites without the need to constantly monitor movement of the fishing line.

A fish bite detector comprising an alarm is disclosed in EP1147704. A fish bite detector comprising an illumination means is disclosed in EP2147596.

Wireless fish bite detector systems are known in the art. Such systems comprise at least one fish bite detector and a portable receiver device. The or each fish bite detector comprises a transmitter, wherein the transmitter is configured to transmit a wireless signal upon the fish bite detector detecting a fish bite. The portable receiver device comprises a receiver configured to receive each wireless signal transmitted by the or each fish bite detector. The portable receiver device further comprises at least one illumination means and/or an alarm, wherein the at least one illumination means is configured to light up and the alarm is configured to sound upon the portable receiver device receiving a wireless signal from a fish bite detector, thereby alerting the angler to the detection of a fish bite. Typically, the wireless signals can be transmitted over hundreds of meters. Accordingly, an angler using a portable receiver device does not need to be within hearing range of their fish bite detector(s), to be alerted to fish bites on their fishing line(s).

Fish bite detectors and wireless fish bite detector systems allow anglers to set up and effectively monitor a number of fishing lines. The angler is no longer required to continuously monitor each fishing line for movement, when using fish bite detectors, and so is able to set up multiple fishing lines. Furthermore, use of a portable receiver device allows the angler to spread their fishing lines over a greater area, because all of the fishing lines no longer need to be within the hearing range of the angler. Using a number of fishing lines and fishing over a greater area increases the likelihood of the angler making catch. Accordingly, fish bite detectors and wireless fish bite detector systems are advantageous.

However, while it is desirable to not have to continuously monitor fishing lines for fish bites, anglers are generally interested in monitoring their "runs". In fishing terminology, a "run" refers to: the line taken by the biting fish; the alarm a fish bite detector makes upon detecting a fish bite; and the behaviour of the tackle in response to a fish bite, e.g. how the fishing line moves.

Knowledge of how the tackle behaves in response to a fish bite may be useful: if the tackle has not been set up correctly or optimally, the angler will be aware of this from the "runs" involving that tackle. The angler may then adjust their tackle.

When not continuously monitoring their fishing lines, anglers frequently miss at least part of their "runs": there will be a time delay between the initial fish bite on a fishing line and the angler checking the fishing line. Therefore, nowadays, many anglers attempt to record their "runs". This way, even if they are not continuously monitoring their fishing lines, an angler still sees all of their "runs". Furthermore, recording "runs" has the advantage that the angler is able to share the recordings of their "runs" with others. However, at present, it is very difficult for anglers to record their "runs".

To records "runs" on a fishing line, anglers may set up one or more cameras and/or mobile devices comprising cameras to continuously record the fishing line. It can be appreciated that continuously recording a fishing line is not ideal: the battery of the or each camera and/or mobile device will quickly be drained. Once the battery of every camera and/or mobile device has been drained, "runs" on the fishing line will no longer be recorded. Accordingly, the angler will not be able to record all of their "runs" on the fishing line, when fishing for an extended period of time. Furthermore, the recording(s) that the angler obtains of the fishing line will comprise lots of waste footage (footage of the time between "runs"). The angler will have to search through the waste footage to view their "runs".

Alternatively, anglers may attempt to record their "runs" using cameras and/or mobile devices which are remotely controllable. In other words, the angler may remotely trigger the cameras and/or mobile devices to record. For example, the angler may set up one or more cameras and/or mobile devices facing a fishing line. When the angler is alerted to a fish bite on the fishing line, the angler may remotely trigger the or each camera and/or mobile device to record. However, it can be appreciated that, by the time the angler has triggered the or each camera and/or mobile device to record, at least part of the "run" will have been missed. Furthermore, having to remotely trigger the or each camera and/or mobile device delays the angler from checking the fishing line for a catch, which is obviously disadvantageous.

The present invention enables anglers to successfully record all of their "runs".

SUMMARY OF THE INVENTION

According to the present invention there is provided an angling system comprising:

at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite; and at least one camera or at least one shutter actuator for attachment to a camera comprising a shutter, wherein the or each camera or shutter actuator comprises a receiver or transceiver, wherein the receiver or transceiver of the or each camera or shutter actuator is pairable with the transmitter or transceiver of the or each fish bite detector, wherein the receiver or transceiver of the or each camera or shutter actuator is configured to receive fish bite signals transmitted by each paired fish bite detector, and wherein the or each camera is configured to record upon receiving each fish bite signal, or the or each shutter actuator is configured to actuate a shutter of a camera to which the shutter actuator is attached upon receiving each fish bite signal According to the present invention there is also provided an angling system comprising:

at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite;

at least one camera or at least one shutter actuator for attachment to a camera comprising a shutter, wherein the or each camera or shutter actuator comprises a receiver or transceiver; and a portable receiver device comprising a receiver or transceiver pairable with the transmitter or transceiver of the or each fish bite detector, wherein the receiver or transceiver of the portable receiver device is configured to receive fish bite signals transmitted by each paired fish bite detector, wherein the receiver or transceiver of the or each camera or shutter actuator is pairable with the transmitter or transceiver of the or each fish bite detector, wherein the receiver or transceiver of the or each camera or shutter actuator is configured to receive fish bite signals transmitted by each paired fish bite detector, and wherein the or each camera is configured to record upon receiving each fish bite signal, or the or each shutter actuator is configured to actuate a shutter of a camera to which the shutter actuator is attached upon receiving each fish bite signal, and/or wherein the portable receiver device comprises a transceiver, wherein the transceiver of the portable receiver device is pairable with the receiver or transceiver of the or each camera or shutter actuator, wherein the transceiver of the portable receiver device is configured to transmit a receiver signal to one or more paired cameras or shutter actuators upon receiving each fish bite signal, and wherein the or each camera is configured to record upon receiving each receiver signal, or the or each shutter actuator is configured to actuate a shutter of a camera to which the shutter actuator is attached upon receiving each receiver signal.

Preferably, the angling system comprises one fish bite detector and one camera or shutter actuator, or comprises one fish bite detector and a plurality of cameras or shutter actuators, or comprises a plurality of fish bite detectors and one camera or shutter actuator.

Advantageously, the or each camera or shutter actuator comprises a means for attaching an illumination means, preferably wherein the angling system further comprises at least one illumination means configured for attachment to the or each camera or shutter actuator.

Conveniently, the means for attaching an illumination means and the or each illumination means are configured such that the or each illumination means lights up when attached to the or each camera or shutter actuator, preferably wherein the or each illumination means and the or each camera or shutter actuator are configured such that the or each illumination means lights up upon the camera or shutter actuator to which the illumination means is attached receiving each fish bite or receiver signal.

Preferably, the or each camera or shutter actuator has an illumination means integrally attached, preferably wherein the integrally attached illumination means is configured to light up upon the camera or shutter actuator receiving each fish bite or receiver signal.

Advantageously, the illumination means is an LED.

Conveniently, the or each camera or shutter actuator comprises at least one actuator manipulable to adjust settings of the camera or shutter actuator such as a recording time of the camera or an actuation mode of the shutter actuator.

Preferably, settings of the or each camera or shutter actuator, such as a recording time of the camera or an actuation mode of the shutter actuator, are remotely adjustable.

Advantageously, the or each camera or shutter actuator comprises one or more indicator lights or a display configured to indicate a setup of the camera or shutter actuator.

Conveniently, the or each camera or shutter actuator comprises a means for attachment to a bank stick, rod pod or tripod.

According to the present invention there is additionally provided an angling system comprising:

at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite; and at least one mobile device comprising a camera and a transceiver, the or each mobile device having or being programmed with instructions to trigger the camera to record upon the mobile device receiving a signal from a transmitter or transceiver paired with the transceiver of the mobile device, wherein the transmitter or transceiver of the or each fish bite detector is pairable with the transceiver of the or each mobile device such that each fish bite signal transmitted by the fish bite detector is received by each mobile device paired with the fish bite detector.

According to the present invention there is further provided an angling system comprising:

at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite;

at least one mobile device comprising a camera and a transceiver, the or each mobile device having or being programmed with instructions to trigger the camera to record upon the mobile device receiving a signal from a transmitter or transceiver paired with the transceiver of the mobile device; and a portable receiver device comprising a receiver or transceiver pairable with the transmitter or transceiver of the or each fish bite detector, wherein the receiver or transceiver of the portable receiver device is configured to receive fish bite signals transmitted by each paired fish bite detector, wherein the transmitter or transceiver of the or each fish bite detector is pairable with the transceiver of the or each mobile device such that each fish bite signal transmitted by the fish bite detector is received by each mobile device paired with the fish bite detector, and/or wherein the portable receiver device comprises a transceiver, wherein the transceiver of the portable receiver device is configured to transmit a receiver signal upon receiving each fish bite signal, wherein the transceiver of the portable receiver device is pairable with the transceiver of the or each mobile device such that each receiver signal transmitted by the transceiver of the portable receiver device is received by one or more mobile devices paired with the portable receiver device.

Preferably, the or each mobile device has or is programmed with instructions to trigger the camera to record for a time period upon the mobile device receiving a signal from a transmitter or transceiver paired with the transceiver of the mobile device, wherein the instructions are editable to adjust the time period.

Advantageously, the angling system further comprises at least one holder for a mobile device, wherein the holder comprises a means for attachment to a bank stick, rod pod or tripod.

BRIEF DESCRIPTION OF THE DRAWINGS

The invention will now be described with reference to the attached drawings, in which.

DETAILED DESCRIPTION

Figure 1A:
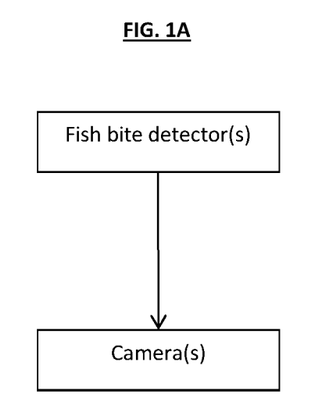
FIGS. 1A-1C depict arrangements of the present invention comprising at least one camera. The arrows in FIGS. 1A-1C represent wireless signals.
Figure 1B:
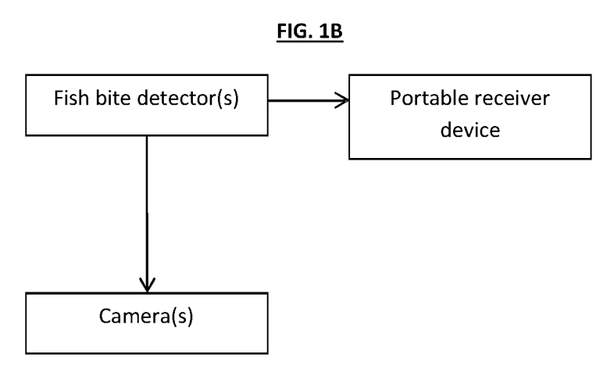
Figure 1C:
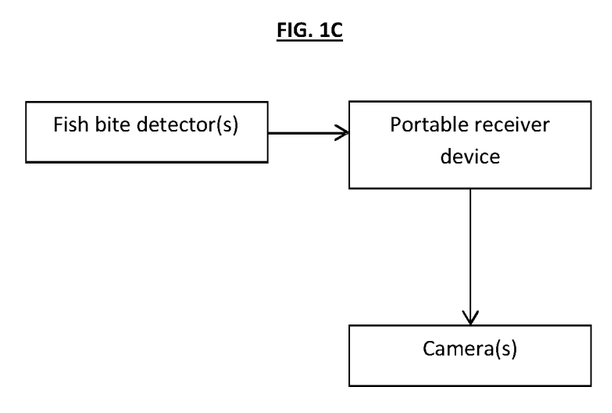

FIGS. 1A-1C depict generally three angling systems according to the present invention. Each angling system comprises at least one fish bite detector and at least one camera.

Figure 2A:
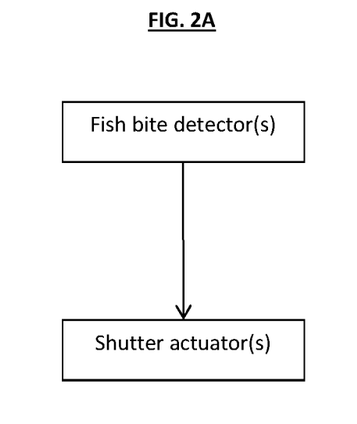
FIGS. 2A-2C depict arrangements of the present invention comprising at least one shutter actuator. The arrows in FIGS. 2A-2C represent wireless signals.
Figure 2B:
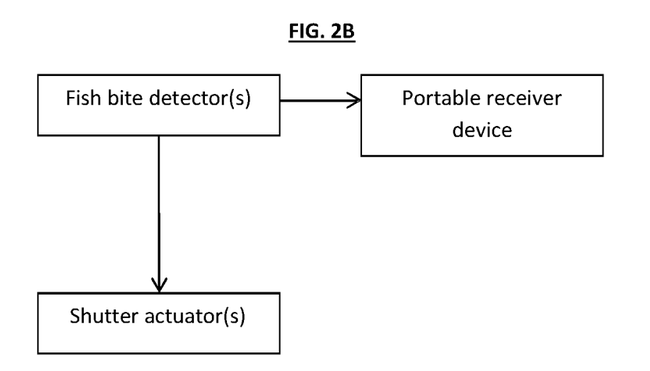
Figure 2C:
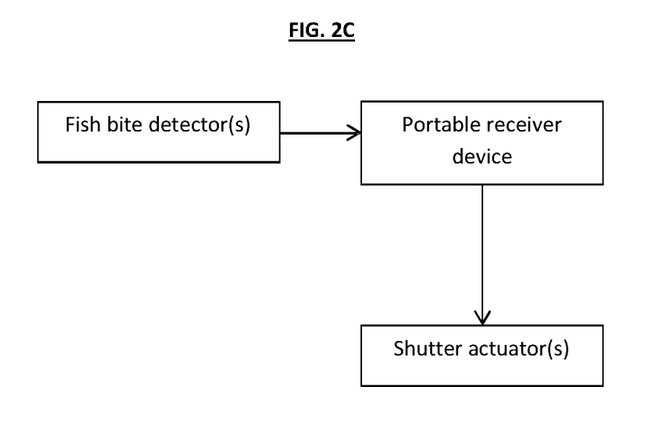

FIGS. 2A-2C also depict generally three angling systems according to the present invention. Similar to the angling systems depicted in FIGS. 1A-1C, each angling system comprises at least one fish bite detector. In contrast to the angling systems depicted in FIGS. 1A-1C, each angling system further comprises at least one shutter actuator for attachment to a camera comprising a shutter.

In all arrangements of the present invention, the or each fish bite detector comprises a fish bite sensor connected to a transmitter or transceiver, wherein, upon the fish bite sensor detecting a fish bite, the transmitter or transceiver is configured to transmit a wireless "fish bite" signal.

In all arrangements of the present invention comprising at least one camera or at least one shutter actuator, the or each camera or shutter actuator comprises a receiver or transceiver.

In arrangements of the present invention comprising at least one camera, the receiver or transceiver of the or each camera may be pairable with the transmitter or transceiver of the or each fish bite detector. The receiver or transceiver of the or each camera may be configured to receive "fish bite" signals transmitted by each paired fish bite detector. The or each camera may be configured to record upon receiving each "fish bite" signal.

For example, in an arrangement of the invention comprising two fish bite detectors, the or each camera may be pairable with both fish bite detectors. The user may choose to pair the or each camera with one or both of the fish bite detectors. If a camera is only paired with one of the fish bite detectors, it will only receive "fish bite" signals from said one fish bite detector and will only record when said one fish bite detector detects a fish bite. If a camera is paired with both fish bite detectors, the camera will receive "fish bite" signals from both fish bite detectors and will record when either fish bite detector detects a fish bite.

In the arrangements of the invention depicted in FIGS. 2A-2C, the or each shutter actuator is configured for attachment to a camera comprising a shutter. Arrangements of the invention comprising at least one shutter actuator may be used with cameras comprising shutters that are already owned by the user.

In arrangements of the invention comprising more than one shutter actuator, more than one camera comprising a shutter may be used with the angling system. For example, in arrangements comprising three shutter actuators, the user may use up to three cameras comprising shutters with the angling system. The user must simply attach a shutter actuator to each camera they wish to use with the angling system.

In arrangements of the invention comprising at least one shutter actuator, the receiver or transceiver of the or each shutter actuator may be pairable with the transmitter or transceiver of the or each fish bite detector. The receiver or transceiver of the or each shutter actuator may be configured to receive "fish bite" signals transmitted by each paired fish bite detector. The or each shutter actuator may be configured to, when attached to a camera, actuate the shutter of the camera upon receiving each "fish bite" signal, thereby triggering the camera to record.

It can be appreciated that, in arrangements of the invention comprising more than one fish bite detector, the user may pair the or each shutter actuator with one or more fish bite detectors, such that the camera to which the shutter actuator has been attached, is triggered to record upon the shutter actuator receiving each "fish bite" signal from any of the one or more paired fish bite detectors.

As can be seen in FIGS. 1B-1C and 2B-2C, the angling system of the present invention may further comprise a portable receiver device. The portable receiver device may comprise a receiver or transceiver, wherein the receiver or transceiver of the portable receiver device is pairable with the transmitter or transceiver of the or each fish bite detector. The receiver or transceiver of the portable receiver device may be configured to receive "fish bite" signals transmitted by each paired fish bite detector.

The portable receiver device may further comprise at least one illumination means, a haptic actuator, an alarm, or any combination thereof. The at least one illumination means may be configured to light up upon the portable receiver device receiving each "fish bite" signal; the haptic actuator may be configured to vibrate upon the portable receiver device receiving each "fish bite" signal; and the alarm may be configured to sound upon the portable receiver device receiving each "fish bite" signal. Accordingly, the portable receiver device may alert the user to a fish bite.

Advantageously, in arrangements of the invention comprising more than one fish bite detector, the portable receiver device may further comprise a means for notifying the user as to which paired fish bite detector transmitted the received "fish bite" signal, such that the user knows which fishing line to check. For example, the portable receiver may comprise a display or a series of indicator lights.

In preferred arrangements of the invention, the portable receiver device may receive "fish bite" signals from paired fish bite detectors up to 250 m away.

In some arrangements, as depicted in FIGS. 1B and 2B, both the portable receiver device and the or each camera or shutter actuator are pairable with the or each fish bite detector. In such embodiments, the user may pair the or each fish bite detector with the portable receiver device and one or more cameras or shutter actuators. Upon detection of a fish bite, the or each fish bite detector will transmit a "fish bite" signal. The "fish bite" signal will be received by both the paired portable receiver device, alerting the user to the fish bite, and the one or more paired cameras or shutter actuators, triggering said one or more paired cameras to record or said one or more paired shutter actuators to actuate the shutters of the cameras to which the paired shutter actuators have been attached.

In some arrangements of the invention, as depicted in FIGS. 1C and 2C, the portable receiver device comprises a transceiver. The transceiver of the portable receiver device is pairable with the receiver or transceiver of the or each camera or shutter actuator, wherein the transceiver of the portable receiver device is configured to transmit a wireless "receiver" signal to one or more paired cameras or shutter actuators upon receiving each "fish bite" signal, and wherein the or each camera is configured to record upon receiving each "receiver" signal or the or each shutter actuator is configured to actuate the shutter of a camera to which the shutter actuator has been attached upon receiving each "receiver" signal.

Preferably, in arrangements comprising more than one fish bite detector, the portable receiver device comprises at least one actuator, e.g. button or dial, manipulable by the user to adjust settings of the portable receiver device. The user may manipulate the at least one actuator of the portable receiver device to set which paired camera(s) or paired shutter actuator(s), if any, a "receiver" signal is transmitted to when each "fish bite" signal is received from the first fish bite detector, when each "fish bite" signal is received from the second fish bite detector, and so on.

For example, in an arrangement comprising: two fish bite detectors A and B; two cameras C and D; and a portable receiver device, the user may pair both fish bite detectors A and B with the portable receiver device, such that the user is alerted to fish bites detected by either of the fish bite detectors A and B. The user may also pair both cameras C and D with the portable receiver device and use the at least one actuator of the portable receiver device to set which of cameras C and D a "receiver" signal is sent to when each "fish bite" signal is received from fish bite detector A, and which of cameras C and D a "receiver" signal is sent to when each "fish bite" signal is received from fish bite detector B. The user may, for example, set the portable receiver device such that a "receiver" signal is sent to camera D upon the portable receiver device receiving each "fish bite" signal from fish bite detector B, and to both cameras C and D upon the portable receiver device receiving each "fish bite" signal from fish bite detector A.

It can be appreciated that, in arrangements of the invention comprising a portable receiver device: a) the or each camera or shutter actuator may be pairable with the or each fish bite detector as shown in FIGS. 1B and 2B: b) the or each camera or shutter actuator may be pairable with the portable receiver device as shown in FIGS. 1C and 2C: or c) the or each camera or shutter actuator may be pairable with both the or each fish bite detector and the portable receiver device. In case c), the user may choose whether to pair each camera or shutter actuator directly with one or more fish bite detectors, or with the portable receiver device.

In preferred arrangements of the invention, the or each fish bite detector comprises at least one actuator manipulable by the user to pair the fish bite detector with one or more cameras or one or more shutter actuators and/or, if present, a portable receiver device. Similarly, the or each camera or shutter actuator may comprise at least one actuator manipulable by the user to pair the camera or shutter actuator with one or more fish bite detectors and/or, if present, a portable receiver device. The portable receiver device may comprise at least one actuator manipulable by the user to pair the portable receiver device with one or more fish bite detectors. In some arrangements of the invention, the portable receiver device may comprise at least one actuator manipulable by the user to pair the portable receiver device with one or more cameras or shutter actuators.

In arrangements of the invention comprising at least one camera, the user may set up a fishing line with one from the at least one fish bite detectors attached. The user may place one or more of the at least one cameras near to the fishing line, wherein each of the one or more cameras faces the fishing line. In some arrangements of the invention, the user may pair the one or more cameras facing the fishing line with the fish bite detector attached to the fishing line, such that the one or more cameras are triggered to record the fishing line when a fish bite is detected by the fish bite detector. In other arrangements, the user may pair the fish bite detector and the one or more cameras with a portable receiver device, and set the portable receiver device to transmit a "receiver" signal to the one or more cameras upon the portable receiver device receiving a "fish bite" signal from the fish bite detector, such that the one or more cameras are triggered to record the fishing line when a fish bite is detected by the fish bite detector. In arrangements of the invention comprising more than one fish bite detector, the use may set up further fishing lines similarly.

In arrangements of the invention comprising at least one shutter actuator, the user may set up the angling system to record "runs" in a similar manner to as described for arrangements comprising at least one camera. However, instead of placing one or more cameras supplied as part of the present invention near to and facing a fishing line with a fish bite detector attached, the user must place one or more of their own cameras, each with a shutter actuator attached, near to and facing the fishing line. The user may then pair the shutter actuators attached to said one or more cameras with the fish bite detector attached to the fishing line, or with a portable receiver device.

It can be appreciated that arrangements comprising at least one shutter actuator are advantageous where the user already owns one or more cameras, with which the user wishes to record their "runs".

In general, users do not own a plurality of cameras. Therefore, it can be appreciated that arrangements of the invention comprising a plurality of cameras, which allow the user to record "runs" from a plurality of fishing lines, are also advantageous.

It can be appreciated that an angling system comprising both at least one shutter actuator and at least one camera would be advantageous. The user may use their own camera (s) with the angling system. The user would also be able to record "runs" form a plurality of fishing lines.

It is envisaged to produce angling systems comprising shutter actuators configured for use with different makes and models of camera. For example, one angling system of the invention may comprise a shutter actuator or shutter actuators configured for attachment to a certain make or model of camera. Another angling system of the invention may comprise a shutter actuator or shutter actuators configured for attachment to a different make or model of camera. Furthermore, it is envisaged to produce angling systems comprising shutter actuators that are adjustable such that they may be used with a variety of different makes and models of camera. Advantageously, each shutter actuator is compatible with a plurality of makes and models of camera.

In some arrangements of the present invention, the angling system comprises one fish bite detector and one camera or shutter actuator. In some arrangements of the present invention, the angling system comprises one fish bite detector and more than one camera or shutter actuator. In some arrangements of the present invention, the angling system comprises more than one fish bite detector and one camera or shutter actuator.

It can be appreciated that, in arrangements comprising more than one camera or shutter actuator, the user may position multiple cameras of the invention, or multiple of their own cameras, to face one fishing line, such that the "runs" of the fishing line are recorded from a number of different angles.

It can also be appreciated that, in arrangements comprising multiple fish bite detectors, the user may position a camera of the invention or their own camera to face more than one fishing line, such that the camera records the "runs" of each fishing line of the more than one fishing line.

The majority of cameras currently on the market comprise a shutter button that the user must press/manipulate to actuate the shutter of the camera. To record video with such cameras, it is usually necessary to hold down the shutter button for the full recording period, or to press the shutter button once to start recording and again to stop recording. It is envisaged that, in some arrangements of the present invention, the or each shutter actuator comprises a moving part and is configured for attachment to, or attachment proximate to, the shutter button of a camera comprising a shutter button. Upon such a shutter actuator receiving a "fish bite" or "receiver" signal, the moving part moves so as to press/manipulate the shutter button of a camera to which the shutter actuator has been attached, thereby triggering the camera to record. For example, the moving part may press and hold the shutter button for a time period, or the moving part may press and release the shutter button a first and a second time with a time period in between.

It can be appreciated that the or each shutter actuator need not necessarily be configured for attachment to or attachment proximate to a shutter button of a camera, but that this represents a particularly favourable arrangement of the present invention, because the majority of cameras presently on the market comprise a shutter button.

In particularly favourable arrangements of the present invention, the or each camera or shutter actuator comprises a means for attaching an illumination means. Preferably, the angling system comprises at least one illumination means configured for attachment to the or each camera or shutter actuator. Ideally, the angling system comprises the same number of cameras or shutter actuators as illumination means configured for attachment to the or each camera or shutter actuator.

In some arrangements of the invention, the or each illumination means and the means for attaching an illumination means are configured such that the or each illumination means lights up when attached to the or each camera or shutter actuator. In further arrangements of the invention, the or each camera or shutter actuator and the or each illumination means are configured such that the or each illumination means lights up upon the camera or shutter actuator to which the illumination means is attached receiving a "fish bite" or "receiver" signal.

In some arrangements of the present invention, the or each camera or shutter actuator has an illumination means integrally attached. The integrally attached illumination means may be configured to light up upon the camera or shutter actuator receiving a "fish bite" or "receiver" signal.

It can be appreciated that an illumination means is useful when fishing at night or in conditions with poor lighting. The illumination means illuminates the vicinity of the camera or shutter actuator to which the illumination means is attached, including the fishing line to be recorded by the camera or shutter actuator, such that the user may still record the fishing line at night or in conditions with poor lighting.

In arrangements of the invention wherein the or each camera or shutter actuator comprises an integrally attached illumination means, the or each camera or shutter actuator may comprise an actuator manipulable by the user to disable the illumination means. For example, the actuator may be manipulable by the user to turn off the illumination means or to prevent the illumination means from lighting up upon the camera or shutter actuator receiving a "fish bite" or "receiver" signal. It can be appreciated that the actuator manipulable to disable the illumination means prevents energy wastage when fishing in conditions with good lighting.

In some arrangements of the invention, the angling system further comprises an illumination means comprising a means for attachment to a bank stick, rod pod or tripod, or comprising one from at least one magnet, at least one clamp, and at least one strap, wherein the at least one magnet, at least one clamp or at least one strap may be used to mount the camera on a surface or other support.

In some arrangements of the invention, the illumination means is an LED.

In some arrangements of the invention, the or each camera or shutter actuator comprises at least one actuator manipulable by the user to adjust settings of the camera or shutter actuator. For example, in preferred arrangements of the invention, upon receiving a "fish bite" or "receiver" signal, the or each camera is triggered to record for a set time period, e.g. 30 seconds, 1 minute, etc. The or each camera may comprise at least one actuator manipulable by the user to adjust the time period for which the camera is set to record (i.e. the recording time) upon receiving a "fish bite" or "receiver" signal.

As previously described, the or each shutter actuator may be configured for attachment to, or attachment proximate to, the shutter button of a camera, and may comprise a moving part. The moving part may press and hold the shutter button for a time period, upon such a shutter actuator receiving a "fish bite" or "receiver" signal. In such arrangements, the or each shutter actuator may comprise at least one actuator manipulable by the user to adjust the time period for which the moving part is set to hold down the shutter button of a camera to which the shutter actuator has been attached upon receiving a "fish bite" or "receiver" signal. In other words, the or each shutter actuator may comprise at least one actuator manipulable by the user to adjust the recording time of a camera to which the shutter button has been attached.

Also as previously described, in some arrangements, upon the shutter actuator receiving a "fish bite" or "receiver" signal, the moving part may press and release the shutter button of a camera to which the shutter actuator has been attached a first time followed by a second time with a time period in between. In such arrangements, the or each shutter actuator may comprise at least one actuator manipulable by the user to adjust the time period in between the first time and second time. In other words, the or each shutter actuator may comprise at least one actuator manipulable by the user to adjust the recording time of a camera to which the shutter button has been attached.

It can be appreciated that, in arrangements in which the or each shutter actuator comprises a moving part, the at least one actuator manipulable by the user to adjust settings may be manipulable by the user to switch between a first mode, in which the moving part presses and holds the shutter button of a camera to which the shutter actuator has been attached, and a second mode, in which the moving part presses and releases the shutter button of a camera to which the shutter actuator has been attached a first time followed by a second time with a time period in between.

Although only recording time has been described in detail, it can be appreciated that many other settings may be adjusted using the at least one actuator. For example, in arrangements comprising at least one camera, typical camera settings such as image quality, white balance, etc. may be adjustable using the at least one actuator.

In some arrangements of the invention, settings of the or each camera or shutter actuator may be remotely adjustable. For example, in arrangements comprising a portable receiver device pairable with the or each camera or shutter actuator, settings of the or each camera or shutter actuator may be adjustable using the portable receiver device. The portable receiver device may comprise at least one actuator manipulable by the user to adjust settings of the or each camera or shutter actuator. Manipulation of the at least one actuator by the user may cause one or more wireless "setting" signals to be transmitted from the portable receiver device to one or more paired cameras or shutter actuators, wherein, upon receiving the one or more wireless "setting" signals, a setting of the one or more paired cameras or shutter actuators is adjusted.

In some arrangements of the invention, the or each camera or shutter actuator may be pairable with a mobile device, such as a phone or tablet, such that the user may remotely adjust settings of the or each camera or shutter actuator using the mobile device.

It can be appreciated that arrangements wherein the settings of the or each camera or shutter actuator are remotely adjustable are advantageous. The user may readily adjust the settings of the or each camera or shutter actuator without having to visit the or each camera or shutter actuator. Additionally, it may be possible to adjust the settings of multiple cameras or shutter actuators simultaneously, saving time.

In arrangements of the invention wherein the settings of the or each camera or shutter actuator are adjustable, the or each camera or shutter actuator may comprise one or more indicator lights or a display configured to indicate to the user the current settings of the camera or shutter actuator (i.e. the setup).

In some arrangements of the invention comprising at least one camera, the or each at least one camera comprises a means for attachment to a bank stick, rod pod or tripod. Preferably, the means for attachment is an external screw thread. A large number of rod pods and bank sticks on the market comprise internal screw threads.

Accordingly, cameras comprising external screw threads may be readily attached to the majority of bank sticks and rod pods currently on the market.

It can be appreciated that it is advantageous for the or each camera to comprise a means for attachment to a bank stick or rod pod, because bank sticks and rod pods are pieces of equipment that the user of the angling system is likely to already own. Furthermore, because bank sticks and rod pods are used in the setup of fishing lines and fish bite detectors, extra equipment to support the or each camera is not required.

In arrangements wherein the or each camera comprises a means for attachment to a rod pod, the user may attach both a fish bite detector and a camera to record "runs" to the same rod pod.

In some arrangements of the invention comprising at least one camera, the or each at least one camera comprises one from at least one magnet, at least one clamp, and at least one strap, wherein the at least one magnet, at least one clamp or at least one strap may be used to mount the camera on a surface or other support.

In some arrangements of the invention comprising at least one shutter actuator, the or each at least one shutter actuator is shaped and configured so as to additionally function, when attached to a camera, as a holder for the camera. In such arrangements, the or each shutter actuator comprises: a means for attachment to a bank stick, rod pod or tripod; or one from at least one magnet, at least one clamp, and at least one strap, wherein the at least one magnet, at least one clamp or at least one strap may be used to mount the camera on a surface or other support.

In preferred arrangements of the invention, the or each camera or shutter actuator comprises a rechargeable battery connected to a charging port. Advantageously, the angling system further comprises a charger for charging the or each camera or shutter actuator.

In arrangements of the invention wherein the or each camera or shutter actuator comprises a charging port, the or each camera or shutter actuator preferably also comprises a cover portion configured to cover the charging port when not in use and prevent water, dust and debris entering the charging port. The cover portion may be removable or movable. In arrangements wherein the cover portion is removable, the user may remove the cover portion to use the charging port. In arrangements wherein the cover portion is moveable, the user may, for example, rotate or slide the cover portion to access the charging port.

In a preferred arrangement of the invention, the cover portion is of rubber.

In preferred arrangements of the invention, the or each camera is water resistant, such that the camera may be used in rainy or humid conditions. In some arrangements of the invention comprising at least one camera, the angling system may further comprise at least one water resistant cover, wherein each water resistant cover is configured to cover the or each camera. Ideally, the angling system comprises the same number of water resistant covers as cameras.

In arrangements of the invention comprising at least one shutter actuator, the angling system may further comprise at least one water resistant camera cover. In such arrangements of the invention, the user may attach a shutter actuator to each of their own cameras for use with the angling system, and may cover each of their own cameras with a water resistant camera cover. The at least one water resistant cover enables the camera(s) of the user to be used in humid or rainy conditions.

In some arrangements of the invention, the or each shutter actuator may additionally function as a water resistant camera cover.

Figure 3A:
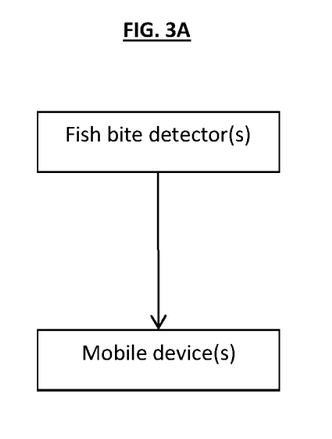
FIGS. 3A-3C depict arrangements of the present invention comprising a mobile device. The arrows in FIGS. 3A-3C represent wireless signals.
Figure 3B:
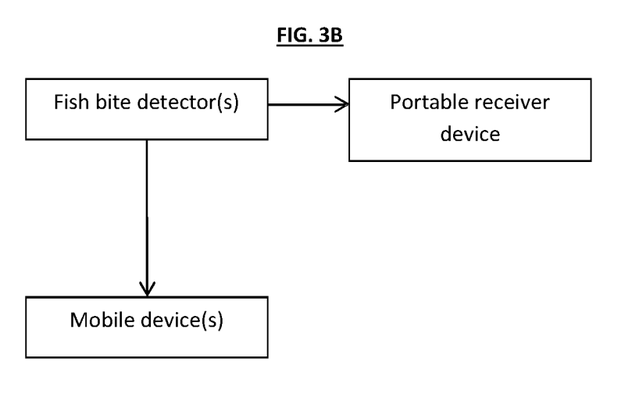
Figure 3C:
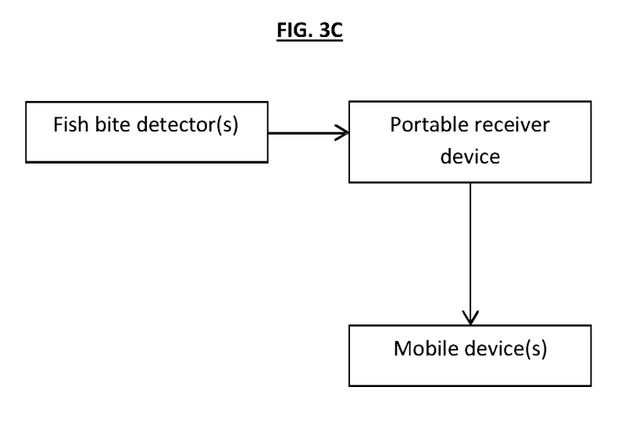

Alternative angling systems according to the present invention are depicted in FIGS. 3A-3C. Each angling system comprises at least one fish bite detector, wherein the or each fish bite detector comprises a fish bite sensor connected to a transmitter or transceiver, and wherein the or each fish bite detector is configured to transmit a wireless "fish bite" signal upon the fish bite sensor detecting a fish bite.

The angling systems depicted in FIGS. 3A-3C all additionally comprise at least one mobile device, such as a phone or tablet, comprising a camera and a transceiver, the or each mobile device having or being programmed with instructions to trigger the camera of the mobile device to record upon the mobile device receiving a signal from a transmitter or transceiver paired with the transceiver or the mobile device.

In some arrangements of the invention, the transmitter or transceiver of the or each fish bite detector is pairable with the transceiver of the or each mobile device, such that each "fish bite" signal transmitted by the transmitter or transceiver of the fish bite detector is received by the transceiver of each paired mobile device, triggering the camera of each paired mobile device to record.

As depicted in FIGS. 3B-3C, the angling system may further comprise a portable receiver device comprising a receiver or transceiver pairable with the transmitter or transceiver of the or each fish bite detector, wherein the receiver or transceiver of the portable receiver device is configured to receive "fish bite" signals transmitted by each paired fish bite detector. The portable receiver device may be configured to alert the user to fish bites as previously described for angling systems comprising at least one camera or shutter actuator.

In arrangements as depicted in FIG. 3C, the portable receiver device comprises a transceiver configured to transmit a wireless "receiver" signal upon receiving each "fish bite" signal transmitted by the transmitter or transceiver of each paired fish bite detector. The transceiver of the portable receiver device is pairable with the transceiver of the or each mobile device such that each "receiver" signal transmitted by the transceiver of the portable receiver device is received by the transceiver of each paired mobile device, triggering the camera of each paired mobile device to record.

Preferably, in arrangements comprising more than one fish bite detector, the portable receiver device comprises at least one actuator, e.g. button or dial, manipulable by the user to adjust settings of the portable receiver device. The user may manipulate the at least one actuator of the portable receiver device to set which paired mobile(s), if any, a "receiver" signal is transmitted to when each "fish bite" signal is received from the first fish bite detector, when each "fish bite" signal is received from the second fish bite detector, and so on.

It can be appreciated that, in arrangements of the invention comprising a portable receiver device: a) the or each fish bite detector may be pairable with the or each mobile device as shown in FIG. 3B: b) the portable receiver device may be pairable with the or each mobile device as shown in FIG. 3C: or c) both the or each fish bite detector and the portable receiver device may be pairable with the or each mobile device. In case c), the user may choose whether to pair the or each mobile device with one or more fish bite detectors or with the portable receiver device.

Any mobile device having a camera may be used in the present angling system. In other words, a mobile device already owned by the user may be used in the present angling system. To be able to use their mobile device in the angling system, the user may simply download, onto their mobile device, the instructions to trigger the camera of their mobile device to record upon their mobile device receiving a signal from a transmitter or transceiver paired with the transceiver of their mobile device. The instructions may be in the form of application software (i.e. in the form of an app).

The or each fish bite indicator may be Bluetooth enabled for ready pairing with Bluetooth enabled mobile devices. The portable receiver device may be Bluetooth enabled for ready pairing with Bluetooth enabled mobile devices. In preferred arrangements of the invention, the wireless "fish bite" or "receiver" signals are Bluetooth signals.

In preferred arrangements of the invention, the or each mobile device has or is programmed with instructions to trigger the camera of the mobile device to record for a time period (recording time) upon the mobile device receiving a "fish bite" or "receiver" signal. Preferably, the instructions are editable to adjust the recording time. For example, where the instructions are in the form of an app, the user may be able to adjust the recording time in the app.

It can be appreciated that the instructions may be editable to adjust other settings of the camera of the mobile device.

In some arrangements of the invention, the angling system further comprises at least one holder for a mobile device. The user my use the holder(s) to hold the mobile device(s) used with angling system.

In preferred arrangements of the invention, the or each holder comprises a means for attachment to a bank stick, rod pod or tripod such as an external screw thread. Advantageously, the or each holder comprises one from at least one magnet, at least one clamp, and at least one strap, wherein the at least one magnet, at least one clamp or at least one strap may be used to mount the holder on a surface or other support. The advantages of comprising a means for attachment to a bank stick, rod pod or tripod are as previously described for arrangements comprising at least one camera or shutter actuator.

In preferred arrangements of the invention, the or each holder further comprises an illumination means. In alternative arrangements of the invention, the or each holder comprises a means for attachment of an illumination means and the angling system further comprises at least one illumination means configured for attachment to the or each holder.

In some arrangements of the invention, the angling system comprises at least one illumination means, wherein the or each illumination means comprises a means for attachment to a bank stick, rod pod or tripod, or wherein the or each illumination means comprises one from at least one magnet, at least one clamp, and at least one strap. The at least one magnet, at least one clamp or at least one strap may be used to mount the illumination means on a surface or other support.

In some arrangements of the invention, the illumination means is an LED.

It can be appreciated, as previously described, that an illumination means is advantageous when fishing at night or in poor lighting conditions.

In some arrangements of the invention, the angling system comprises at least one water resistant cover for a mobile device. In other arrangements of the invention, the or each holder also functions as water resistant cover for a mobile device. A water resistant cover is advantageous for protecting a mobile device used with the angling system when fishing in humid conditions or in the rain.

Any arrangement of the present invention may further comprise a smartband wearable by the user and pairable with the or each fish bite detector. The smartband may act as analogously to a portable receiver device, alerting the user to fish bites.

A smartband wearable by the user may have all of the features and functionalities previously described for a portable receiver device.

It is also envisaged that the angling system of the present invention may comprise at least one dongle for attachment to a fish bite detector, in place of the at least one fish bite detector. Most fish bite detectors on the market comprise a 2.5 mm or 3.5 mm phone jack. In preferred arrangements of the present invention, the or each dongle is configured for attachment to a 2.5 mm or 3.5 mm phone jack. The or each dongle may be attached to a third party bite alarm, thereby making the third party bite alarm compatible with the angling system of the present invention. In other words, the or each dongle enables third party bite alarms to be paired with cameras, shutter actuators, portable receiver devices, mobile devices and smartbands of the present invention.

In the foregoing description, "at least one actuator" may additionally refer to a touchscreen.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination, be utilised for realising the invention in diverse forms thereof.

What is claimed is:

1. An angling system comprising:
    at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite; and
    at least one camera or at least one shutter actuator for attachment to a camera comprising a shutter, wherein the or each camera or shutter actuator comprises a receiver or transceiver,
    wherein the angling system comprises: one fish bite detector and a plurality of cameras or shutter actuators; a plurality of fish bite detectors and one camera or shutter actuator; or a plurality of fish bite detectors and a plurality of cameras or shutter actuators,
    wherein the receiver or transceiver of the or each camera or shutter actuator is pairable with the transmitter or transceiver of the or each fish bite detector, wherein the or each fish bite detector comprises at least one actuator manipulable by a user to pair said fish bite detector with the or each camera or shutter actuator, or wherein the or each camera or shutter actuator comprises at least one actuator manipulable by the user to pair said camera or shutter actuator with the or each fish bite detector,
    wherein the receiver or transceiver of the or each camera or shutter actuator is configured to receive fish bite signals transmitted by each paired fish bite detector, and wherein the or each camera is configured to record for a time period upon receiving each fish bite signal, or the or each shutter actuator is configured to actuate a shutter of a camera to which the shutter actuator is attached upon receiving each fish bite signal such that said camera records for a time period.

2. The angling system of claim 1, wherein the or each camera or shutter actuator comprises a means for attaching an illumination means, and preferably wherein the angling system further comprises at least one illumination means configured for attachment to the or each camera or shutter actuator.

3. The angling system of claim 2, wherein the means for attaching an illumination means and the or each illumination means are configured such that the or each illumination means lights up when attached to the or each camera or shutter actuator, and preferably wherein the or each illumination means and the or each camera or shutter actuator are configured such that the or each illumination means lights up upon the camera or shutter actuator to which the illumination means is attached receiving each fish bite or receiver signal.

4. The angling system of claim 1, wherein the or each camera or shutter actuator has an illumination means integrally attached, preferably wherein the integrally attached illumination means is configured to light up upon the camera or shutter actuator receiving each fish bite or receiver signal.

5. The angling system of claim 4, wherein the illumination means is an LED.

6. The angling system of claim 1, wherein the or each camera or shutter actuator comprises at least one actuator manipulable to adjust settings of the camera or shutter actuator such as a recording time of the camera or an actuation mode of the shutter actuator.

7. The angling system of claim 1, wherein settings of the or each camera or shutter actuator, such as a recording time of the camera or an actuation mode of the shutter actuator, are remotely adjustable.

8. The angling system of claim 1, wherein the or each camera or shutter actuator comprises one or more indicator lights or a display configured to indicate a setup of the camera or shutter actuator.

9. The angling system of claim 1, wherein the or each camera or shutter actuator comprises a means for attachment to a bank stick, rod pod or tripod.

10. An angling system comprising:
    at least one fish bite detector, wherein the or each fish bite detector comprises a fish bite sensor connected to a transmitter or transceiver, and wherein the or each fish bite detector is configured to transmit a fish bite signal upon the fish bite sensor detecting a fish bite;
    at least one camera or at least one shutter actuator for attachment to a camera comprising a shutter, wherein the or each camera or shutter actuator comprises a receiver or transceiver;
    wherein the angling system comprises: one fish bite detector and a plurality of cameras or shutter actuators; a plurality of fish bite detectors and one camera or shutter actuator; or a plurality of fish bite detectors and a plurality of cameras or shutter actuators; and
    a portable receiver device comprising a receiver or transceiver pairable with the transmitter or transceiver of the or each fish bite detector, wherein the receiver or transceiver of the portable receiver device is configured to receive fish bite signals transmitted by each paired fish bite detector;
    wherein the receiver or transceiver of the or each camera or shutter actuator is pairable with the transmitter or transceiver of the or each fish bite detector, wherein the or each fish bite detector comprises at least one actuator manipulable by a user to pair said fish bite detector with the or each camera or shutter actuator, or wherein the or each camera or shutter actuator comprises at least one actuator manipulable by the user to pair said camera or shutter actuator with the or each fish bite detector;
wherein the receiver or transceiver of the or each camera or shutter actuator is configured to receive fish bite signals transmitted by each paired fish bite detector, and wherein the or each camera is configured to record for a time period upon receiving each fish bite signal, or the or each shutter actuator is configured to actuate a shutter of a camera to which the shutter actuator is attached upon receiving each fish bite signal such that said camera records for a time period; and/or wherein the portable receiver device comprises a transceiver, wherein the transceiver of the portable receiver device is pairable with the receiver or transceiver of the or each camera or shutter actuator, wherein the transceiver of the portable receiver device is configured to transmit a receiver signal to one or more paired cameras or shutter actuators upon receiving each fish bite signal, and wherein the or each camera is configured to record for a time period upon receiving each receiver signal, or the or each shutter actuator is configured to actuate a shutter of a camera to which the shutter actuator is attached upon receiving each receiver signal such that said camera records for a time period.

* * * * *